United States Patent
Zandbergen et al.

(10) Patent No.: US 9,358,851 B2
(45) Date of Patent: Jun. 7, 2016

(54) INDEPENDENT WHEEL SUSPENSION FOR THE NON-DRIVEN WHEELS OF A VEHICLE

(71) Applicant: FORD GLOBAL TECHNOLOGIES, LLC, Dearborn, MI (US)

(72) Inventors: Paul Zandbergen, Montzen (BE); Daniel Mainz, Herzogenrath (DE); Steve Scott Allen, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 10 days.

(21) Appl. No.: 14/224,683

(22) Filed: Mar. 25, 2014

(65) Prior Publication Data

US 2014/0291951 A1 Oct. 2, 2014

(30) Foreign Application Priority Data

Mar. 26, 2013 (DE) .......................... 10 2013 205 335

(51) Int. Cl.
| | |
|---|---|
| *B60G 3/18* | (2006.01) |
| *B60G 3/20* | (2006.01) |
| *B60G 7/00* | (2006.01) |
| *B60G 7/02* | (2006.01) |
| *B60G 11/16* | (2006.01) |

(52) U.S. Cl.
CPC *B60G 3/20* (2013.01); *B60G 7/001* (2013.01); *B60G 7/008* (2013.01); *B60G 7/02* (2013.01); *B60G 11/16* (2013.01); *B60G 2200/18* (2013.01); *B60G 2200/42* (2013.01); *B60G 2204/1244* (2013.01); *B60G 2204/143* (2013.01); *B60G 2204/148* (2013.01); *B60G 2206/121* (2013.01); *B60G 2206/16* (2013.01)

(58) Field of Classification Search
CPC ........ B60G 2200/14; B60G 3/18; B60G 3/20; B60G 3/00; B60G 7/008
USPC ............... 280/86.758, 86.757, 86.751, 86.75, 280/124.135, 124.134
See application file for complete search history.

(56) References Cited

U.S. PATENT DOCUMENTS

| | | | | |
|---|---|---|---|---|
| 4,848,788 | A | * | 7/1989 | Rumpel ................. 280/124.138 |
| 5,292,149 | A | * | 3/1994 | Luger ..................... B60G 3/26 280/5.521 |

(Continued)

FOREIGN PATENT DOCUMENTS

EP 1937498 B1 7/2008

OTHER PUBLICATIONS

Manabu Abe, Vehicular Suspension Device, Jan. 19, 2012, JPO, JP 2012-11901 A, English Abstract.*

(Continued)

*Primary Examiner* — James English
(74) *Attorney, Agent, or Firm* — Jones Robb, PLLC; Raymond L. Coppiellie

(57) ABSTRACT

An independent wheel suspension for the non-driven wheels of a vehicle comprises a wheel carrier for rotatably mounting a wheel of the vehicle, the wheel carrier being connected to a first transverse link and a second transverse link. The first transverse link is configured to be torsionally stiff and comprises a U-shaped opening in the link. The first transverse link is connected to the vehicle body via two link bearings on a body side and is connected to the wheel carrier via two link bearings on a wheel carrier side. The wheel suspension includes a bearing spring supported on the vehicle body and on the wheel carrier and positioned within the U-shaped opening of the first transverse link.

26 Claims, 4 Drawing Sheets

(56) References Cited

U.S. PATENT DOCUMENTS

| | | | |
|---|---|---|---|
| 6,019,383 A * | 2/2000 | Kociba et al. | 280/124.134 |
| 6,588,779 B2 * | 7/2003 | Sandahl et al. | 280/124.135 |
| 6,755,429 B1 * | 6/2004 | Buchwitz et al. | 280/124.109 |
| 7,784,806 B2 | 8/2010 | Schmidt et al. | |
| 8,056,912 B2 * | 11/2011 | Kawabe et al. | 280/124.135 |
| 8,267,416 B2 | 9/2012 | Allen et al. | |
| 2005/0140110 A1 * | 6/2005 | Lee et al. | 280/124.109 |
| 2007/0001420 A1 * | 1/2007 | Schmidt et al. | 280/124.134 |
| 2010/0201086 A1 * | 8/2010 | Sagara et al. | 280/5.522 |
| 2010/0276896 A1 * | 11/2010 | Sano | 280/5.509 |
| 2011/0291376 A1 | 12/2011 | Allen et al. | |
| 2012/0292875 A1 * | 11/2012 | Koide et al. | 280/124.153 |
| 2012/0292876 A1 * | 11/2012 | Koide et al. | 280/124.179 |

OTHER PUBLICATIONS

Manabu Abe, Vehicular Suspension Device, Jan. 19, 2012, JPO, JP 2012-11901 A, Machine Translation of Description.*

* cited by examiner

US 9,358,851 B2

INDEPENDENT WHEEL SUSPENSION FOR THE NON-DRIVEN WHEELS OF A VEHICLE

CROSS REFERENCE TO RELATED APPLICATIONS

This application claims priority to German Application No. 10 2013 205335.5, filed on Mar. 26, 2013, the entire content of which is incorporated by reference herein.

TECHNICAL FIELD

The present disclosure relates generally to an independent wheel suspension for the non-driven wheels of a vehicle, and more particularly, a motor vehicle.

BACKGROUND

Independent wheel suspensions for non-driven wheels of a motor vehicle are known. Such suspensions are typically very heavy. Attempts to decrease the weight of such suspension have been made. For example, EP 1 937 498 B1, discloses a wheel suspension in the form of a trapezoidal link axle. Another trapezoidal link axle is disclosed, for example, in U.S. Pat. No. 7,784,806 B2. Such suspensions, however, make use of conventional torsionally stiff transverse links, which due to their H-shape and the resultant positioning of elements of the suspension relative to the H-shape, results in additional weight in a wheel suspension and/or a less than compact construction of the wheel suspension.

In view of this background, the object of the present disclosure is to provide an independent wheel suspension, which is more lightweight and of more compact construction than the known wheel suspensions.

SUMMARY

In accordance with various exemplary embodiments, the present disclosure provides an independent wheel suspension for the non-driven wheels of a vehicle. The wheel suspension comprises a wheel carrier for rotatably mounting a wheel of the vehicle, the wheel carrier being connected in an articulated manner to a first transverse link and a second transverse link. The first transverse link is configured to be torsionally stiff and has two transverse members and a longitudinal member connecting the transverse members to substantially form a U-shape. The torsionally stiff transverse link is connected to the vehicle body in an articulated manner via two link bearings on a body side and is connected to the wheel carrier in an articulated manner via two link bearings on a wheel carrier side. The wheel suspension further comprises a bearing spring supported on the vehicle body and on the wheel carrier and arranged between the transverse members of the first transverse link. A first connecting line passing through the link bearings on the body side and a second connecting line passing through the link bearings on the wheel carrier side at least approximately intersect forward of the wheel carrier in a link plane of the torsionally stiff transverse link in a longitudinal direction of the vehicle.

In accordance with another aspect of the present disclosure, an independent wheel suspension comprises a wheel carrier for rotatably mounting a wheel of the vehicle. The wheel carrier is hingedly connected to a first transverse link and a second transverse link. The first transverse link is configured to be torsionally stiff and comprises a U-shaped opening in the link. The first transverse link is hingedly connected to the vehicle body via two link bearings on a body side and is hingedly connected to the wheel carrier via two link bearings on a wheel carrier side. The wheel suspension further comprises a bearing spring supported on the vehicle body and on the wheel carrier and positioned within the U-shaped opening of the first transverse link.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
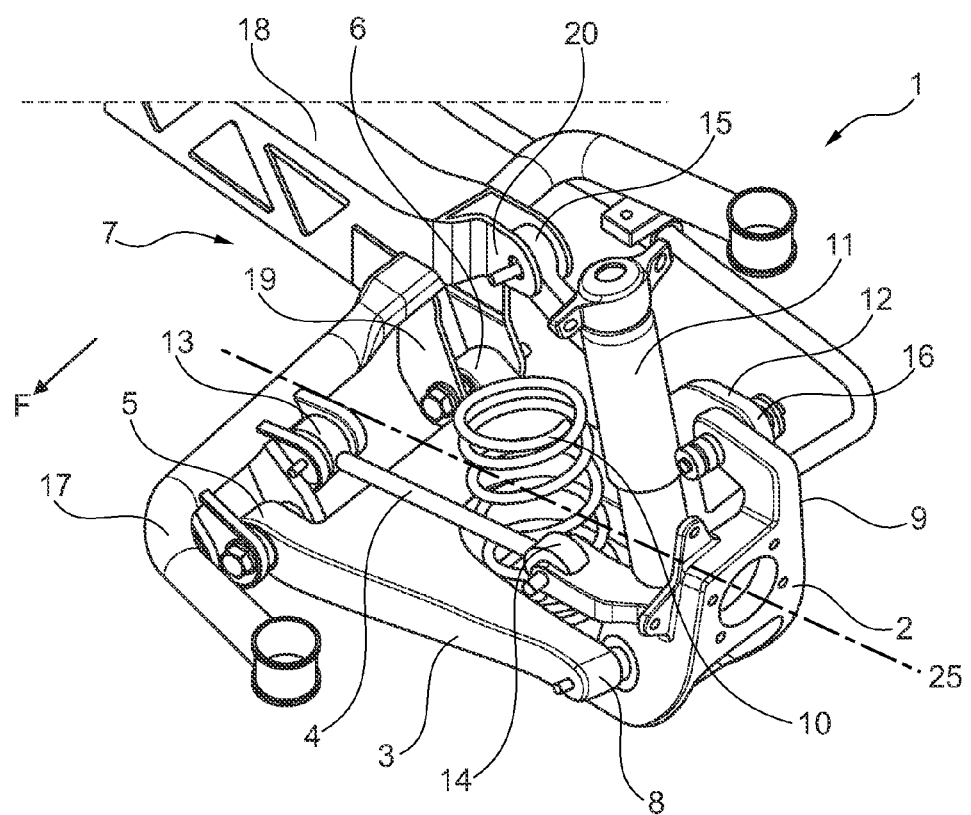
FIG. 1 is an oblique frontal perspective view of an exemplary embodiment of a wheel suspension according to the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The terms "forward" and "rearward" are used herein to describe a relative position of one wheel suspension component relative to another. As used herein, "forward" and "rearward" relate to a relative arrangement of the wheel suspension components in the longitudinal direction of the vehicle (i.e., a front or rear of the vehicle). These components may also be either "forward" or "rearward" in the longitudinal direction of the vehicle relative to a direction of travel of the vehicle. Thus, for example, when comparing components, the component that is advancing first in the direction of travel of the vehicle is the "forward" component and the component that is advancing after the first component, because of its relative position "behind" the first component in the direction of travel, is the "rearward" component. In the same manner, the terms "above" and "below" used herein refer to a positional description of two wheel suspension components relative to one another in a vertical direction of the vehicle and "inside" and "outside" refer to a relative position of the wheel suspension components in a transverse direction of the vehicle.

In accordance with the present disclosure, an independent wheel suspension for the non-driven wheels of a vehicle, in particular a motor vehicle, comprises a wheel carrier to which a wheel is rotatably mounted. The wheel carrier is articulated to a first transverse link. The first transverse link is configured to be torsionally stiff. The torsionally stiff transverse link is articulated to the vehicle body via two link bearings on the body side and to the wheel carrier via two link bearings on the wheel carrier side. Moreover, a connecting line of the link bearings on the body side (i.e., an imaginary line passing though the link bearings on the body side) and a connecting line of the link bearings on the wheel carrier side (i.e., an imaginary line passing though the link bearings on the vehicles side), at least approximately intersect forward of the wheel carrier in a longitudinal direction of the vehicle. In other words, the torsionally stiff transverse link is a so-called trapezoidal link. The wheel carrier also is articulated to at least a second transverse link.

The wheel suspension according to the present disclosure further comprises a bearing spring supported on the vehicle body and on the wheel carrier. According to the present teachings, the torsionally stiff transverse link is configured to be substantially U-shaped with two transverse members and a longitudinal member connecting the transverse members together, wherein the bearing spring is arranged between the transverse members.

Conventional torsionally stiff transverse links and/or trapezoidal links typically have an H-shape and are also denoted as H-shaped links. In contrast, in the wheel suspension according to the present disclosure, the longitudinal member of the trapezoidal link connecting the two transverse members together is pushed appreciably in the direction of one end of the transverse members in order to form a clear U-shape of the trapezoidal link. Described another way, a first longitudinal edge of the trapezoidal link tapers inward (i.e., in a transverse direction relative to the vehicle) toward a second longitudinal edge of the trapezoidal link to form a generally U-shaped curve in the first longitudinal edge of the trapezoidal link, thereby giving the trapezoidal link a U-shape. Through this means sufficient space is provided between the transverse members of the trapezoidal link in order to be able to arrange, for example, the bearing spring or a shock absorber between the transverse members as disclosed herein. This structure of the torsionally stiff transverse link and the positioning of the bearing spring and/or shock absorber permits a particularly compact arrangement of the wheel suspension components, such as for example further transverse links, bearing spring, shock absorber, auxiliary frame, etc. in all three spatial directions, i.e., in the longitudinal, vertical, and transverse directions of the vehicle. The specific U-shape of the trapezoidal link additionally permits the trapezoidal link to be configured to be more lightweight in comparison with the aforementioned H-shaped links, without reducing, in particular, its torsionally stiff properties and/or its stability. In any case, the U-shaped trapezoidal link according to the present disclosure has spacing between the free outer ends of the transverse members, to which the wheel carrier is attached, so as to ensure the desired low resilience with regard to the caster characteristics of the wheel suspension according to the present teachings.

Additionally and/or alternatively, the torsionally stiff transverse link may have a generally rectangular, trapezoidal, or other shape and may include a U-shaped opening through which a bearing spring and/or a shock absorber may be positioned.

For a particularly compact construction of the wheel suspension, in the longitudinal direction of the vehicle, an exemplary embodiment of the present disclosure provides that the bearing spring extends through the wheel center axis 25 defined by the wheel carrier.

In another exemplary embodiment of the present disclosure, the bearing spring is supported in the link plane of the torsionally stiff transverse link and/or trapezoidal link or thereunder on an extension arm arranged on the wheel carrier. In this manner, a compact design of the wheel suspension may be produced, in particular in the vertical direction of the vehicle.

In a further exemplary embodiment of a wheel suspension in accordance with the present teachings, the link bearings of the torsionally stiff transverse link and/or trapezoidal link on the wheel carrier side are directly connected to the wheel carrier and do not make use of an additional intermediate link extending, for example, perpendicular to the link plane of the trapezoidal link.

In yet another exemplary embodiment of the present disclosure, in addition to the first torsionally stiff transverse link, second and third transverse links are provided, each of these further transverse links being articulated to the wheel carrier by a link bearing on the wheel carrier side and to the vehicle body by a link bearing on the body side. Both the second and third links are arranged above the link plane of the torsionally stiff transverse link and/or trapezoidal link and in the longitudinal direction of the vehicle neither forward nor rearward of the torsionally stiff transverse link and/or trapezoidal link. In other words, the second and third transverse links are arranged positioned above the torsionally stiff transverse link and/or trapezoidal link and are further arranged inboard of outer edges of the torsionally stiff transverse link. That is the second and third transverse links are arranged relative to the trapezoidal link such that the second and third transverse links are arranged substantially between the forward edge of the front transverse member of the U-shaped trapezoidal link and the rearward edge of the rear transverse member of the U-shaped trapezoidal link, in the longitudinal direction of the vehicle. This creates a compact construction of the wheel suspension in the longitudinal direction of the vehicle because no construction space is required for the arrangement of the wheel suspension components of the wheel suspension either forward or rearward of the torsionally stiff transverse link and/or trapezoidal link.

In accordance with one exemplary embodiment of the present disclosure, one of the second and third transverse links substantially functions as a toe link and is arranged forward of the wheel center axis 25. The other of the second and third transverse links substantially functions as a camber link and is arranged rearward of the wheel center axis 25. According to the above terminology, both the toe link and the camber link in the present exemplary embodiment are substantially configured as transverse links. Within the meaning of the present disclosure, this is to be understood that the two links are aligned substantially parallel to the transverse direction of the vehicle. In other words, the longitudinal direction of the vehicle and the link bearings on the wheel carrier side and the link bearings on the body side are in each case not particularly spaced apart from one another, in contrast to a link implemented substantially as a longitudinal link. In accordance with the present teachings this permits a design of the wheel suspension with a relatively high degree of resilience of the wheel suspension in the longitudinal direction of the vehicle. Such a construction is advantageous, particularly with regard to the hardness of the suspension in the event of impacts, without permitting excessive kinematic toe-in of the wheel suspension in the toe-in direction, for example when braking, as is the case in a toe link aligned substantially in the longitudinal direction of the vehicle.

According to another aspect of the present disclosure, an exemplary embodiment of a wheel suspension includes an auxiliary frame via which the link bearings of all transverse links on the body side are connected to the vehicle body. The auxiliary frame is formed, for example, from a longitudinal beam extending substantially in the longitudinal direction of the vehicle and a cross member extending substantially transversely to the longitudinal member and bearing (supporting) the longitudinal beam. In the region of the longitudinal beam, the cross member comprises a forked end portion including first and second ends. One end of the forked end portion is arranged below the longitudinal beam in the vertical direction of the vehicle and the other end is arranged above the longitudinal beam in the vertical direction of the vehicle. The torsionally stiff transverse link is articulated to one of the two ends of the cross member by one of its two link bearings on the body side and one of the second and third transverse links is articulated to the other of the two ends of the cross member by its link bearing on the body side. This embodiment permits the torsionally stiff transverse link and/or trapezoidal link as well as an additional transverse link to be directly connected to the cross member. As a result, the conventional provision of clamp-like connecting elements on a longitudinal beam may be eliminated, thereby simplifying the construction of the wheel suspension and reducing a weight of the construction by eliminating connecting elements on the longitudinal beams.

Additional exemplary embodiments of the present disclosure provide that the rearward link bearing of the trapezoidal link on the wheel carrier side is arranged forward of its rearward link bearing on the body side in the longitudinal direction of the vehicle. Additionally, the forward link bearing of the trapezoidal link on the body side is positioned forward of the forward link bearing on the wheel carrier side. Also, a shock absorber is provided and is supported on the vehicle body and on the wheel carrier or on the torsionally stiff transverse link and is arranged between the longitudinal members of the torsionally stiff U-shaped transverse link.

FIG. 1 is a perspective view of an exemplary embodiment of a wheel suspension for the non-driven wheels (not shown) of a vehicle, in particular a motor vehicle, in accordance with the present teachings. In FIG. 1 the forward direction of travel of the vehicle, which corresponds to a longitudinal direction of the vehicle, is illustrated by a directional arrow F.

As shown in FIG. 1, a wheel suspension 1 comprises a wheel carrier 2 for rotatably mounting a wheel (not shown). The wheel carrier is connected in an articulated manner to a transverse link 3 and to at least one further transverse link 4. The transverse link 3 is configured to be torsionally stiff and is connected in an articulated manner to the vehicle body and/or an auxiliary frame 7 (which is connected to the vehicle body) via two link bearings 5 and 6 on the body side. The transverse link 3 may be characterized as a trapezoidal link 3 and, in the remainder of this application, the two terms are used interchangeably. Trapezoidal link 3 is connected in an articulated manner to the wheel carrier 2 via two link bearings 8 and 9 on the wheel carrier side. The link bearings 5, 6, 8 and 9 may, for example, be configured as conventional rubber-metal bush bearings.

As shown in the exemplary embodiment of FIG. 1, the wheel suspension 1 comprises a bearing spring 10 supported on the vehicle body (not shown) and on the wheel carrier 2. The wheel suspension 1 further comprises a shock absorber 11 supported on the vehicle body (not shown) and on the trapezoidal link 3.

As shown in FIG. 1, trapezoidal link 3 has a substantially U-shaped configuration: two transverse members of the link extend in the transverse direction of the vehicle, (a front and a rear transverse member extending transverse to the longitudinal direction F of the vehicle) are connected to one another via a longitudinal member extending in the longitudinal direction and/or direction of travel F of the vehicle. The U-shape of trapezoidal link 3 also can be seen in FIG. 2.

The bearing spring 10 and the shock absorber 11 are both arranged between the transverse members of the trapezoidal link 3 and extend between the transverse members substantially in the vertical direction of the vehicle shown in FIG. 1. In particular, in the exemplary embodiment of wheel suspension 1 shown the bearing spring 10 extends through a wheel center axis 25 defined by the wheel carrier 2 and the shock absorber 11 is slightly to the rear of the wheel center axis 25.

Figure 2:
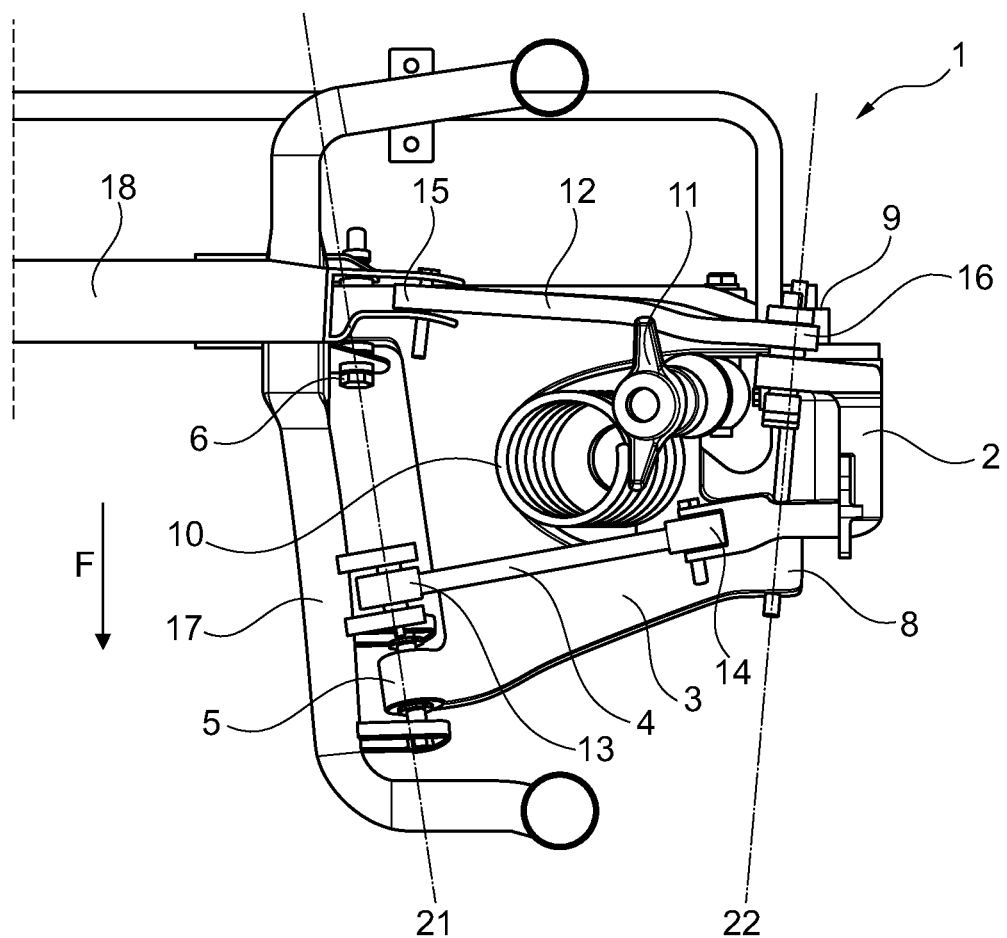
FIG. 2 is a plan view of the wheel suspension of FIG. 1 from above.

Largely concealed by the shock absorber 11 in FIG. 1, a second further transverse link 12 extends to the rear of the shock absorber 11. Transverse link 12 is connected in an articulated manner to the wheel carrier 2 and to the vehicle body (not shown) and/or the auxiliary frame 7 (see FIG. 2). In the longitudinal direction and/or direction of travel F of the vehicle, the first further transverse link 4 is positioned forward of both the shock absorber 11 and the bearing spring 10. As shown in FIGS. 1 and 2, transverse link 4 is connected in an articulated manner to the vehicle body via a link bearing 13 on the body side and/or to the auxiliary frame 7 and is connected in an articulated manner to the wheel carrier 2 via a link bearing 14 on the wheel carrier side. In a similar manner, the second further transverse link 12 is connected in an articulated manner to the vehicle body and/or the auxiliary frame 7 via a link bearing 15 on the body side and 12 is connected in an articulated manner to the wheel carrier 2 via a link bearing 16 on the wheel carrier side. The link bearings 13, 14, 15 and 16 may, for example, be configured as conventional rubber-metal bush bearings.

As already mentioned, the transverse links 3, 4 and 12 and, in particular, the corresponding link bearings 5, 6, 13 and/or 15 on the body side, are not directly connected to the vehicle body but instead are connected to the vehicle body via the auxiliary frame 7. As shown in FIG. 1, the auxiliary frame 7 of the wheel suspension 1 is formed from a longitudinal beam 17 extending substantially in the longitudinal direction and/or direction of travel F of the vehicle and a cross member 18 bearing the longitudinal beam 17, the cross member 18 extending substantially transversely to the direction of travel F (see FIG. 4). In the region of the longitudinal beam 17, the cross member 18 has a forked end portion including two ends, a lower end 19 and an upper end 20 (see FIG. 1). The lower end 19 is arranged below the longitudinal beam 17 in the vertical direction of the vehicle and the upper end 20 is arranged above the longitudinal beam 17. As shown in FIG. 1, the trapezoidal link 3 of the wheel suspension 1 is directly connected in an articulated manner to the lower end 19 of the cross member 18 by its rear link bearing 6 and the transverse link 12 is directly connected in an articulated manner to the upper end 20 of the cross member 18 by its link bearing 15 on the body side. Thus, in the exemplary embodiment of the wheel suspension 1 shown in FIG. 1, the use of conventional clamp-like connecting elements to attach the link bearings 6 and 15 of the transverse links 3 and/or 12 on the body side to the longitudinal beam 17 may be dispensed with, such that the entire structure of the wheel suspension 1 is simplified and weight may be reduced.

FIG. 2 shows a plan view of the wheel suspension 1 of FIG. 1. In FIG. 2, a connecting line 21 (an imaginary line extending through an axis of articulation (or through a pivot axis of hinge elements providing the articulated connections) of the link bearings 5 and 6 of the trapezoidal link 3 on the body side and a connecting line 22 (an imaginary line extending through an axis of articulation (or through a pivot axis of hinge elements providing the articulated connections) of the link bearings 8 and 9 of the trapezoidal link 3 on the wheel carrier side are illustrated. As shown in FIG. 2, connecting line 21 and connecting line 22 intersect approximately forward of the wheel carrier 2 in the longitudinal direction and/or direction of travel F of the vehicle. Moreover, the link bearings 8 and 9 of the trapezoidal link 3 are directly connected to the wheel carrier 2 and not by the interposition of an additional intermediate link.

In FIG. 2, the two further transverse links 4 and 12 may be clearly seen. Both of the transverse links 4, 12 are arranged above the link plane of the trapezoidal link 3. As shown, the front transverse link 4 is not arranged forward of the trapezoidal link 3, in the longitudinal direction and/or direction of travel F of the vehicle, nor is the rear transverse link 12 arranged rearward of the transverse link 3, in the longitudinal direction and/or direction of travel F of the vehicle, resulting in a construction of the wheel suspension 1 that, at least in the longitudinal direction of the vehicle, is of particularly compact construction.

In the exemplary embodiment of the wheel suspension 1 shown in FIG. 2, the first further transverse link 4 functions substantially as a toe link and is arranged forward of the wheel center axis 25, shown in FIG. 1, in the longitudinal direction and/or direction of travel F of the vehicle. The second further transverse link 12 functions substantially as a camber link and is arranged rearward of the wheel center axis 25 in the longitudinal direction and/or direction of travel F of the vehicle.

The two transverse links 4 and 12 are arranged to absorb transverse forces acting in the transverse direction of the vehicle. For this reason, the transverse links 4, 12 are substantially aligned in the transverse direction of the vehicle. However, as illustrated in FIG. 2, and in accordance with one exemplary embodiment of the present disclosure, the positioning of each of the transverse links 4, 12 may have a longitudinal component such that a longitudinal axis of either or both of transverse links 4, 12 may form an oblique angle or an acute angle with respect to the longitudinal direction and/or direction of travel F of the vehicle. In FIG. 2, for example, the link bearing 16 of the camber link 12 on the wheel carrier side is arranged forward of its link bearing 15 on the body side in the longitudinal direction and/or direction of travel F of the vehicle. Additionally and/or alternatively, the link bearing 14 of the toe link 4 on the wheel carrier side is arranged slightly rearward of its link bearing 13 on the body side in the longitudinal direction and/or direction of travel F of the vehicle. Through this orienting of transverse links 4 and 12, torques acting on the wheel carrier 2 about the vertical axis of the vehicle may be absorbed more effectively.

Figure 3:
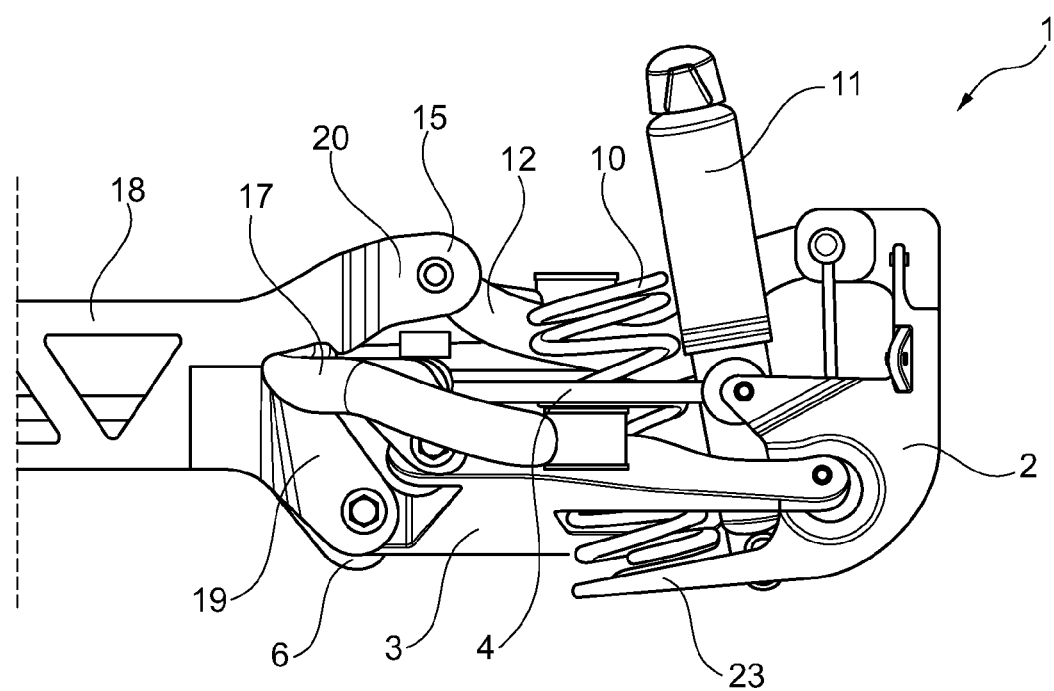
FIG. 3 is a front view of the wheel suspension of FIG. 1.

FIG. 3 shows a front view of the wheel suspension 1 of FIG. 1. FIG. 3 clearly illustrates the forked end portion of cross member 18, showing the lower end 19 and the upper end 20 of the cross member 18. As shown, the rear link bearing 6 of the trapezoidal link 3 on the body side is connected in an articulated manner to lower end 19 and the link bearing 15 of the rear transverse link 12 (camber link) on the body side is connected in an articulated manner to upper end 20. FIG. 3 further shows that the bearing spring 10 is supported below the link plane of the trapezoidal link 3 on an extension arm 23 arranged on the wheel carrier 2, whereby a particularly compact wheel suspension 1 may be produced in the vertical direction of the vehicle.

Figure 4:
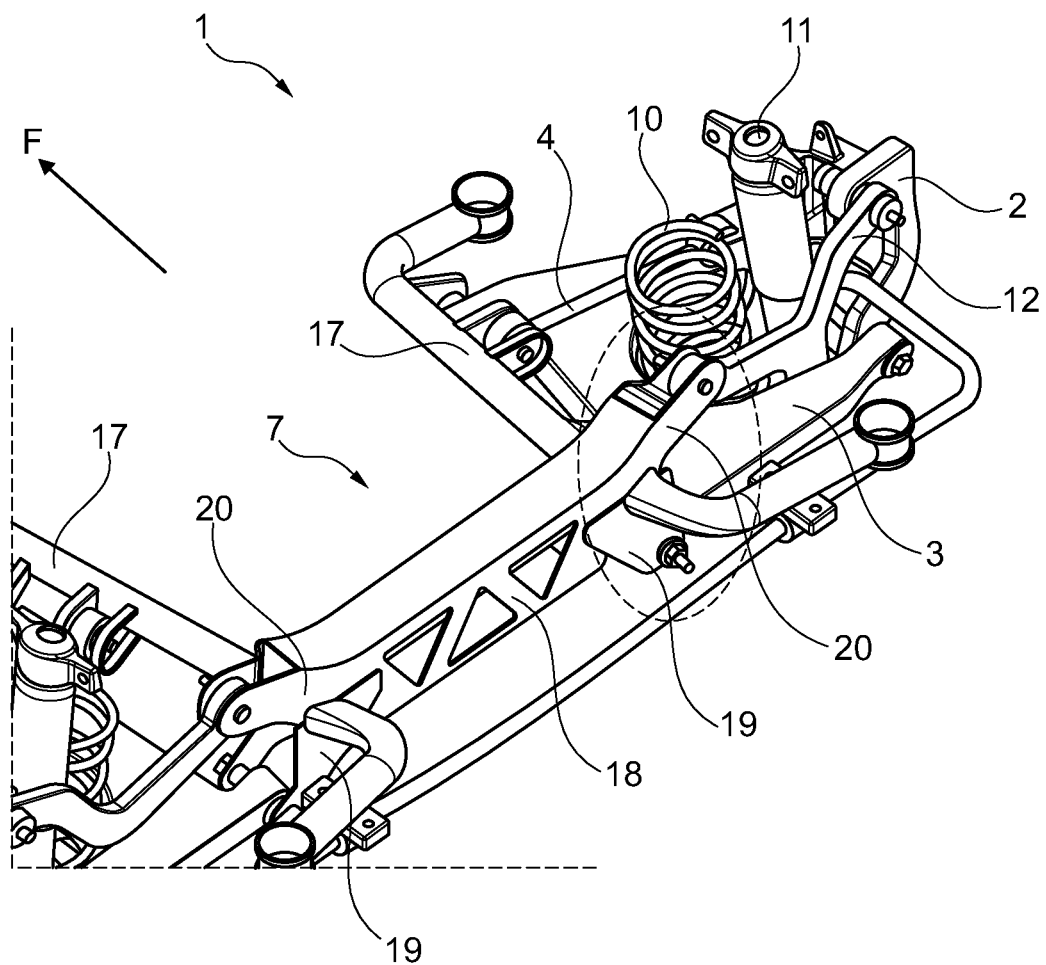
FIG. 4 is an oblique rear perspective view of the wheel suspension of FIG. 1.

FIG. 4 shows, obliquely and from the rear, a perspective view of the wheel suspension 1 of FIG. 1. FIG. 4 shows the cross member 18 bearing a longitudinal beam 17 on either end, the cross member 18 being positioned transversely to the longitudinal direction and/or direction of travel F of the vehicle. As shown, the link bearings of all transverse links 3, 4 and 12 on the body side are either directly attached to the cross member 18 or to corresponding retaining clips on the longitudinal beam 17. As has already been discussed, the direct attachment of the transverse links 3 and 12 to the cross member 18 is produced by means of the lower and upper ends 19 and 20 of the forked end portion of the cross member 18. The arrangement shown in FIG. 4 forms a wheel axle, in particular a rear axle of the vehicle, not shown in more detail.

The above-described independent wheel suspension for the non-driven wheels of a vehicle, in particular for a motor vehicle, is not limited to the embodiment disclosed herein, but also encompasses further embodiments having the same function. Thus, for example, the link bearings of the torsionally stiff transverse link and/or trapezoidal link 3 and, in particular the rear link bearing 6 of the trapezoidal link 3 on the body side, shown in the drawings as rubber-metal bush bearings, may also be configured as ball bearings.

In a preferred embodiment, the wheel suspension according to the present disclosure is used on a rear axle of a front-wheel-drive motor vehicle.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. An independent wheel suspension for the non-driven wheels of a vehicle comprising:
a wheel carrier for rotatably mounting a wheel of the vehicle, the wheel carrier being connected in an articulated manner to a substantially U-shaped trapezoidal link and at least two second transverse links, wherein the substantially U-shaped trapezoidal link is configured to be torsionally stiff and comprises a first substantially straight longitudinal edge and a second longitudinal edge that curves toward the first substantially straight longitudinal edge to form a U-shaped opening in the U-shaped trapezoidal link, the torsionally stiff trapezoidal link being connected to a vehicle body in an articulated manner via one of two link bearings on a body side and being connected to the wheel carrier in an articulated manner via two link bearings on a wheel carrier side; and
a bearing spring configured to extend through the U-shaped opening and below a link plane of the torsionally stiff trapezoidal link to an extension arm arranged on the wheel carrier and below a wheel center axis, the bearing spring being supported on the vehicle body and on the wheel carrier,
wherein a first connecting line passing through the link bearings on the body side and a second connecting line passing through the link bearings on the wheel carrier side at least approximately intersect forward of the wheel carrier in the link plane of the torsionally stiff trapezoidal link in a longitudinal direction of the vehicle.

2. The wheel suspension as claimed in claim 1, wherein the bearing spring extends through a plane containing the wheel center axis.

3. The wheel suspension as claimed in claim 1, wherein the bearing spring is supported on the extension arm arranged on the wheel carrier under the link plane of the torsionally stiff trapezoidal link.

4. The wheel suspension as claimed in claim 1, wherein the link bearings of the torsionally stiff trapezoidal link on the wheel carrier side are directly connected to the wheel carrier.

5. The wheel suspension as claimed in claim 1, wherein each of the at least two second transverse links is connected to the wheel carrier in an articulated manner by a link bearing on the wheel carrier side and is connected to the vehicle body in an articulated manner by a link bearing on the body side, wherein each of the at least two second transverse links is arranged above the link plane of the torsionally stiff trapezoidal link.

6. The wheel suspension as claimed in claim 5, wherein each of the at least two second transverse links is positioned to be neither forward nor rearward of the torsionally stiff trapezoidal link in the longitudinal direction of the vehicle.

7. The wheel suspension as claimed in claim 6, wherein one of the at least two second transverse links functions substantially as a toe link and is arranged forward of a wheel center axis in the longitudinal direction of the vehicle and wherein the other of the at least two second transverse links functions substantially as a camber link and is arranged rearward of the wheel center axis in the longitudinal direction of the vehicle.

8. The wheel suspension as claimed in claim 7, wherein the link bearing of the camber link on the wheel carrier side is arranged forward of the link bearing of the camber link on the body side in the longitudinal direction of the vehicle.

9. The wheel suspension as claimed in claim 5, further comprising an auxiliary frame, the auxiliary frame being formed from a longitudinal beam extending substantially in the longitudinal direction of the vehicle and a cross member extending substantially transversely to the longitudinal beam, wherein the link bearings of each of the torsionally stiff trapezoidal link and the at least two second transverse links connect to the vehicle body via the auxiliary frame.

10. The wheel suspension as claimed in claim 9, wherein a forked end portion of the cross member the longitudinal beam between a lower end and an upper end, wherein the torsionally stiff trapezoidal link is connected to the lower end in an articulated manner by one of its two link bearings on the body side and wherein one of the at least two second transverse links is connected to the upper end in an articulated manner by its link bearing on the body side.

11. The wheel suspension as claimed in claim 1, further comprising a shock absorber arranged between the first and second longitudinal edges that form the U-shaped opening of the torsionally stiff trapezoidal transverse link, the shock absorber being supported on the vehicle body and on the wheel carrier or on the torsionally stiff trapezoidal link.

12. The wheel suspension as claimed in claim 1, wherein the substantially U-shaped trapezoidal link further comprises first and second substantially straight transverse edges.

13. An independent wheel suspension for the non-driven wheels of a vehicle comprising:
a wheel carrier for rotatably mounting a wheel of the vehicle, the wheel carrier being hingedly connected to a first transverse link and hingedly connected to at least two second transverse links arranged inbound of an outer edge of the first transverse link, wherein the first transverse link comprises a U-shaped opening and is configured to be torsionally stiff, the torsionally stiff transverse link being hingedly connected to a vehicle body via two link bearings on a body side and being hingedly connected to the wheel carrier via two link bearings on a wheel carrier side; and a bearing spring positioned between two transverse members that form a portion of the U-shaped opening, the bearing spring extending through the U-shaped opening and under a link plane of the torsionally stiff transverse link, wherein the bearing spring being supported on the vehicle body and on an extension arm arranged on the wheel carrier.

14. The wheel suspension as claimed in claim 13, wherein the bearing spring is supported on the extension arm arranged under a link plane of the first transverse link and below plane containing a wheel center axis.

15. The wheel suspension as claimed in claim 13, wherein the link bearings of the first transverse link on the wheel carrier side are directly connected to the wheel carrier.

16. The wheel suspension as claimed in claim 13, wherein each of the at least two second transverse links is hingedly connected to the wheel carrier by a link bearing on the wheel carrier side and is hingedly connected to the vehicle body by a link bearing on the body side, wherein each of the at least two second transverse links is arranged above the link plane of the first transverse link.

17. The wheel suspension as claimed in claim 16, wherein each of the at least two second transverse links is positioned to be neither forward nor rearward of the torsionally stiff transverse link in the longitudinal direction of the vehicle.

18. The wheel suspension as claimed in claim 17, wherein one of the at least two second transverse links functions substantially as a toe link and is arranged forward of a wheel center axis in the longitudinal direction of the vehicle and wherein the other of the at least two second transverse links functions substantially as a camber link and is arranged rearward of the wheel center axis in the longitudinal direction of the vehicle.

19. The wheel suspension as claimed in claim 16, further comprising an auxiliary frame, the auxiliary frame being formed from a longitudinal beam extending substantially in the longitudinal direction of the vehicle and a cross member extending substantially transversely to the longitudinal beam, wherein the link bearings of each of the torsionally stiff transverse link and the at least two second transverse links connect the vehicle body via the auxiliary frame.

20. The wheel suspension as claimed in claim 19, wherein a forked end portion of the cross member bears the longitudinal beam between a lower end and an upper end, wherein the torsionally stiff transverse link is hingedly connected to the lower end by one of its two link bearings on the body side and wherein one of the at least two transverse links is hingedly connected to the upper end by its link bearing on the body side.

21. The wheel suspension as claimed in claim 13, further comprising a shock absorber positioned within the U-shaped opening of the torsionally stiff transverse link, the shock absorber being supported on the vehicle body and on the wheel carrier.

22. An independent wheel suspension for the non-driven wheels of a vehicle comprising:

a wheel carrier connected to a substantially U-shaped trapezoidal link and connected to at least a toe link and a camber link arranged inboard of an outer edge of the substantially U-shaped trapezoidal link in a longitudinal direction of the vehicle, the substantially U-shaped trapezoidal link being configured to be torsionally stiff and comprising a first substantially straight longitudinal edge and a second longitudinal edge that curves toward the first substantially straight longitudinal edge to form a U-shaped opening in the U-shaped trapezoidal link.

23. The wheel suspension of claim 22, wherein the toe link and the camber links are arranged above the link plane of the torsionally stiff trapezoidal link.

24. The wheel suspension of claim 23, wherein each of the toe link and the camber link is directly connected to the wheel carrier via at least one respective link bearing.

25. The wheel suspension of claim 22, further comprising:

a bearing spring and a shock absorber being positioned between the first substantially straight longitudinal edge and the second longitudinal edge that form the U-shaped opening, the bearing spring and the shock absorber extending through the U-shaped opening and below a link plane of the torsionally stiff trapezoidal link to an extension arm arranged on the wheel carrier, the bearing spring being supported on the vehicle body and on the extension arm arranged on the wheel carrier.

26. The wheel suspension of claim 22, wherein the torsionally stiff trapezoidal link is hingedly connected to the vehicle body at a forked end portion of an auxiliary frame of the vehicle via one link bearing on a body side and is connected to the wheel carrier via two link bearings on a wheel carrier side.

* * * * *